United States Patent Office 3,769,372
Patented Oct. 30, 1973

3,769,372
POLYOL ESTERS OF ALKYLATED-4-HYDROXY-BENZYL PHOSPHINIC ACIDS
John D. Spivack, Spring Valley, N.Y., assignor to Ciba-Geigy Corporation, Greenburgh, N.Y.
No Drawing. Filed May 24, 1971, Ser. No. 146,438
Int. Cl. C07f 9/02, 9/12
U.S. Cl. 260—928      19 Claims

ABSTRACT OF THE DISCLOSURE

Polyol esters of alkylated-4-hydroxybenzyl phosphinic acids of this invention effectively stabilize organic materials against the effects of heat, light, and oxygen. The esters of this invention are prepared by transesterifying a phenyl alkylated-4-hydroxybenzyl phosphinate with the appropriate polyol using conventional techniques or by reacting an acid halide of an alkylated-4-hydroxybenzylphosphinic acid with the appropriate polyol in the presence of a tertiary amine. An example of this class of stabilizers is 2,2,4,4-tetramethyl-1,3-cyclobutanediol-bis-[(3,5-di-tert - butyl - 4 - hydroxybenzyl) benzenephosphinate].

DETAILED DESCRIPTION

This invention relates to alkylated-4-hydroxybenzylphosphinic acid esters of organic polyols. The esters are useful as stabilizers of organic materials which are subject to thermal and oxidative deterioration caused by heat and/or light.

The novel polyol esters of alkylated-4-hydroxybenzyl phosphinic acids of the present invention are represented by the formula:

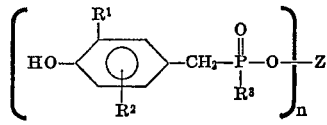

I wherein $R^1$ is a lower alkyl group of from 1 to 4 carbon atoms;
$R^2$ is hydrogen or a lower alkyl group of from 1 to 4 carbon atoms;
$R^3$ is alkyl of from 1 to 4 carbon atoms or phenyl;
$n$ has a value of from 2 to 4; and
Z is a cycloalkylene of from 4 to 8 carbon atoms, alkylenephenylenealkylene of from 8 to 12 carbon atoms, cycloalkylenealkylenecycloalkylene of from 13 to 18 carbon atoms, phenylenealkylenephenylene of from 13 to 15 carbon atoms, or an aliphatic hydrocarbon of the formula $$C_yH_{2y+2-n}$$

in which $y$ has a value of from 2 to 12 when $n$ is 2 and a value of 3 to 7 when $n$ is greater than 2, the value of $y$ in all cases being equal to or greater than that of $n$.

The compounds of the present invention exhibit one alkyl group ($R^1$) in a position ortho to the hydroxy group. A second like or different alkyl group ($R^2$) is optionally present either [a] in the other position ortho to the hydroxy group or [b] meta to the hydroxy group and para to the first alkyl group.

Illustrative examples of lower alkyl groups of from 1 to 4 carbon atoms which are represented by $R^1$ and $R^2$ on the hydroxybenzyl portion of Formula I are methyl, ethyl, propyl, isopropyl, butyl and t-butyl. The preferred groups are methyl, tertiary alkyls t-butyl, and isopropyl.

Thus the mono- or dialkylhydroxybenzyl group includes for example 3,5-di-t-butyl-4-hydroxybenzyl;
3,5-dimethyl-4-hydroxybenzyl;
3,5-di-isopropyl-4-hydroxybenzyl;
2,5-dimethyl-4-hydroxybenzyl;
2-methyl-4-hydroxy-5-t-butylbenzyl;
2-methyl-4-hydroxy-5-isopropylbenzyl;
3-methyl-4-hydroxy-5-t-butylbenzyl;
3,5-diethyl-4-hydroxybenzyl;
2-t-butyl-5-methyl-4-hydroxybenzyl
and the like.

The most preferred groups are those having at least one branched group such as isopropyl, t-butyl or the like in a position ortho to the hydroxy group.

The mono- or dialkyl-4-hydroxybenzyl group is bound to a phosphinyl group.

Attached to the phosphorous atom of the alkylated-4-hydroxybenzylphosphinyl group is an alkyl group of 1 to 4 carbon atoms or an aryl group. Illustrative examples of the alkyl groups which are represented by $R^3$ are methyl, ethyl, propyl and butyl. The most preferred alkyl groups are methyl and ethyl.

The aryl groups are aromatic mono- and polycarbocyclic structures optionally substituted with inert groups such as alkyl, alkoxy and the like. While phenyl is the most common species, groups such as tolyl, naphthyl, chrysyl, anthracyl, t-butylphenyl, and the like are embraced.

Two or more (as determined by the integer $n$) of these mono- or dialkyl-4-hydroxybenzylphosphinyl groups are then bound through a like number of oxygen atoms to the hydrocarbon residue of a polyol. The polyol from which these esters are derived will thus consist of the straight or branched chain hydrocarbon residue of the formula $C_yH_{2y+2-n}$ and a number of hydroxy groups equals to $n$. When $n$ is two, i.e., the polyol is a diol, this hydrocarbon residue will have from 2 to 12 carbon atoms and preferably from 3 to 9 carbon atoms. When $n$ is greater than two; i.e., the polyol is a triol, or tetrol, the hydrocarbon residue will have from 3 to 7 carbon atoms. In all cases the number of hydroxy groups and the resulting number of alkylated-4-hydroxybenzylphosphinyloxy groups (as designated by $n$) will be equal to or less than the number of carbon atoms ($y$) in the hydrocarbon residue; i.e., since each carbon atom of the hydrocarbon residue can bear only one hydroxy group, $y$ is equal to or greater than $n$.

The hydrocarbon portions of the polyols represented by Z may also be a cycloalkylene of from 4 to 8 carbon atoms, substituted and unsubstituted with alkyl groups, such as cyclobutylene, 2,2,4,4-tetramethyl-1,3-cyclobutylene, and cyclohexylene or an alkylenephenylenealkylene group of from 8 to 12 carbon atoms wherein said phenylene portion can be substituted or unsubstituted with alkyl groups, such as 1,4-dimethylenebenzene and durene or a cycloalkylene alkylenecycloalkylene group of from 13 to 18 carbon atoms such as 4,4'-isopropylidenedicyclohexene, 4,4'-methylenedicyclohexene, 4,4'-(1,4-dimethylbutylene)dicyclohexene or a phenylenealkylenephenylene group of from 13 to 15 carbon atoms such as 4,4'-isopropylidenediphenylene, 4,4'-methylenediphenylene and the like.

These polyol esters of mono- and dialkyl-4-hydroxybenzylphosphinic acid are stabilizers of organic material normally subject to thermal and oxidative deterioration caused by light and/or heat. Materials which are thus stabilized include synthetic organic polymeric substances such as vinyl resins formed from the polymerization of vinyl halides or from the copolymerization of vinyl halides or from the copolymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, and the like; including copolymers of poly-$\alpha$-olefins; polyisoprene; polychloroprene; terpolymers of ethylene, propylene and a non-conjugated diene such as 1,4-hexadiene, ethylidenenorbornene, dicyclopentadiene or the like; polybutadiene; polyurethanes such as are prepared from polyols and organic polyisocyanates; polyamides such as polyhexamethylene adipamide; polyesters such as polyethylene terephthalates; polycarbonates; polyacetals; polysytrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphtaic ester type, e.g., di-(2-ethylhexyl)azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, drying oil, cutting fluids, waxes resins and the like; fatty acids such as soaps and the like.

In general the stabilizers of this invention are employed from about 0.005% to about 10% by weight of the stabilized composition, although this will vary with the particular substrate. An advantageous range is from about 0.05 to about 5%, and especially 0.05% to about 2%. These compounds are particularly useful for the stabilization of polyolelns such as polypropylene and polyethylene. They can be blended before polymerization or after polymerization during the usual processing operations, for example, by hot-milling, the composition then being extruded, pressed, or the like into films, fibers, filaments, hollowspheres and the like. The heat stabilizing properties of these compounds advantageously stabilize the polymer against degradation during such processing at the high temperatures generally encountered. The stabilizers can also be dissolved in suitable solvents and sprayed on the surface of films, fabrics, filaments or the like to provide effective stabilization.

These compounds can also be used in combination with other additives such as antioxidants, sulfur-containing esters such as distearyl-$\beta$-thiodipropionate, dilauryl-$\beta$-thiodipropionate (DLTDP) and the like, pourpoint depressants, corrosion and rust inhibitors, dispersing agents, demulsifiers, antifoaming agents, carbon black, accelerators and other chemicals used in rubber compounding, plasticizers, color stabilizers, di- and trialkyl- and -alkylphenylphosphites, heat stabilizers, ultraviolet light stabilizers, dyes, pigments, metal chelating agents, dyesites and the like. Often combinations such as these, particularly the sulfur containing esters, the phosphites and/or the ultraviolet light stabilizers, will produce superior results in certain applications to those expected by the properties of the individual components. In addiition, certain of the compounds of the present invention while demonstrating somewhat less antioxidant activity than other compounds of this invention, are nevertheless more attractive from the standpoint of economics of preparation. Often the antioxidant properties of such compounds can be dramatically enhanced by the use of a small amount of a compound such as DSTDP or DLTDP.

The compounds of the present invention can be prepared via a conventional transesterification procedure. This includes treatment of a polyol of the formula:

$$(HO)_nX \qquad \qquad II$$

wherein Z and $n$ are as defined previously, with at least $n$ equivalents of the phenyl ester of a phosphinic acid of the formula:

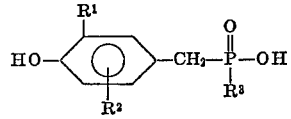

III wherein $R^1$, $R^2$ and $R^3$ are as defined previously.

Use of a phenyl ester of an acid of Formula III involves treatment of the polyol with up to a 15% excess, preferably from 5 to 10% excess, over the stoichiometric amount of the ester. This reaction is catalyzed with a hydride or lower alkoxide of an alkali metal, such as lithium hydride, lithium methoxide or sodium methoxide. These catalysts are employed in an amount from about 0.01 to about 0.30 molar equivalents per mole of polyol. The reaction is conducted at elevated temperatures under a nitrogen atmosphere and under reduced pressure, the phenol which is formed being removed by distillation.

This procedure has one limitation, however, and cannot be used when Z of Formula II is ethylene. The procedure is applicable in preparing the other compounds of this invention.

An alternative method for synthesizing the compounds of this invention consists in reacting the corresponding acid halide of the alkylhydroxybenzylphosphinic acid of Formula III with an equivalent amount of polyhdroxy compound of Formula II in the presence of a tertiary amine such as triethyl amine which acts as an acid scavenger, and isolating the desired alkyl hydroxybenzylphosphinate ester.

The products thus obtained can be purified when desired through conventional techniques such as crystallization, chromatography, distillation or the like. For many applications, the products need not be extensively purified.

The phenyl esters of Formula III can be prepared by reacting an alkylated-4-hydroxybenzyl halide of the formula

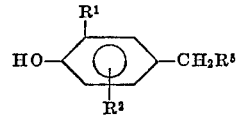

IV wherein $R^1$ and $R^2$ are as defined above, and $R^5$ is chloro, bromo or iodo, in a non-aqueous inert aprotic solvent with phosphorus halides (alternatively named as a halophosphine) of the formula

V wherein each of $R^6$ and $R^7$ is chloro, bromo, or iodo and $R^3$ is as defined previously in the presence of a complexing metal halide Lewis acid. The resultant reaction complex is then treated with an equivalent amount of phenol and then dissociated through the treatment with at least an equivalent amount of $H_2O$ to yield the corresponding phenyl ester. The preparation of the phenyl ester is described in further detail in my copending application Ser. No. 76,998.

The alkylated-4-hydroxybenzyl halides of Formula IV can be prepared for example, through the chloromethylation of an alkyl phenol such as described as starting materials in Example 1 of U.S. Patent No. 3,281,505.

An alternative procedure for preparing the phenyl ester of the compounds of Formula I wherein $R_3$ is phenyl involves the reaction of diphenyl phenylphosphonite with an alkylated-4-hydroxybenzyl halide of Formula IV in an inert solvent such as heptane at a temperature of about 90° C. under a nitrogen atmosphere.

The following are presented to further illustrate the present invention without introducing any limitation thereto.

EXAMPLE 1

Phenyl(3,5-di-tert-butyl-4-hydroxybenzyl) benzenephosphinate 117.8 grams of 3,5-di-tert-butyl-4-hydroxybenzyl chloride (0.456 moles) dissolved in 130 ml. of heptane were added dropwise to a solution of 147 g. of diphenyl phenylphosphonite in 100 ml. of heptane at 85 to 90° C. over a period of 45 minutes in a nitrogen atmosphere. The reaction solution becomes turbid, an oily product appears and becomes crystalline as the addition proceeds. After the addition was completed the thick slurry was stirred at reflux for 5½ hours and then allowed to cool to room temperature. 175 ml. of methanol was added and the clear reaction mixture heated at reflux for 2.5 hours. The solvent was then removed by distillation at atmospheric pressure, the by-product phenol being removed at reduced pressure. 250 ml. of heptane was slowly added to the residue and heated at reflux for 30 minutes and cooled to about 150° C. The precipitate was filtered and triturated with boiling heptane. The white crystals were filtered and recrystallized from cyclohexane, melting at 132–134° C. after drying.

Analysis for $C_{27}H_{33}O_3P_1$: calculated (percent): C, 74.28; H, 7.62; P, 7.09. Found (percent): C, 74.69; H, 7.83; P, 7.11, 7.10.

EXAMPLE 2

2,2-dimethyl-1,3-propanediol-bis-[3,5-ditert-butyl-4-hydroxybenzyl)benzenephosphinate]

2.16 grams of 2,2-dimethyl-1,3propanediol (0.02 mole) and 18.30 g. of phenyl (3,5-di-tert-butyl-4-hydroxybenzyl) benzenephosphinate (0.042 mole) of Example 1 were melted together at about 150° C. under a nitrogen atmosphere. 0.26 gram of sodium methylate was then added and the pink melt heated at 150° C. for 1 hour. Vacuum was then applied and the reaction mixture heated at 150–160° C. for 7 hours under 12 mm. Hg nitrogen pressure while the evolved phenol was collected in a cooled receiver. The reaction mixture was finally heated for 20 minutes at 0.70 mm Hg of nitrogen pressure. In this manner, 3.50 g. of phenol was collected. After cooling, the reaction mixture to room temperature, the vacuum was released and the product dissolved in 100 ml. benzene and the benzene solution successively washed with 2 N sodium bicarbonate, and hot water. The clear light yellow benzene solution was dried over anhydrous sodium sulfate and evaporated under vacuum. The residue was then crystallized from a solvent mixture of benzene and heptane yielding white crystals melting at 175–177° C. to a turbid melt.

Analysis for $C_{47}H_{66}O_6P_2$; mol. wt. 788.96: Calculated (percent): C, 71.54; H, 8:43; P, 7.86. Found (percent): C, 71.46; H, 7.98; P, 7.82.

In a similar fashion, the following diols were substituted in equivalent amounts for 2-2-dimethyl - 1,3 - propanediol by essentially the same procedure as in Example 2.

(a) 2-methyl-2-ethyl-1,3-propanediol
(b) 2,2-diethyl-1,3-propanediol
(c) 2-ethyl-2-butyl-1,3-propanediol
(d) 1,4-dimethylolbenzene
(e) 2,2,4-trimethyl-1,3-pentanediolbis(hydroxymethyl) benzene
(f) 4,4'-isopropylidenedicyclohexanol
(g) 1,6-hexanediol
(h) propylene glycol
(i) 1,12-dodecanediol There were thus respectively obtained:

(a) 2-methyl-2-ethyl - 1,3 - propanediol - bis[(3,5-di-t-butyl - 4 - hydroxybenzyl)benzenephosphinate], M.P. 188–190° C.
(b) 2 - diethyl - 1,3 - propanediol-bis[(3,5-di - t - butyl-4 - hydroxybenzyl)benzenephosphinate], M.P. 192–194.5° C.
(c) 2 - ethyl - 2 - butyl - 1,3 - propanediol-bis[(3,5-di-t-butyl - 4 - hydroxybenzyl)benzenephosphinate], M.P. 178–181° C.
(d) 1,4 - benzenedimethanol - bis[(3,5-di-t-butyl - 4 - hydroxybenzyl)benzenephosphinate], M.P. 213–215° C.
(e) 2,2,4-trimethyl-3,3-pentanediol-bis[(3,5-di - t - butyl-4 - hydroxybenzyl)benzenephosphinate], M.P. 152–154° C.
(f) 4,4 - isopropylidenedicyclohexanol - bis[(3,5 - di - t-butyl - 4 - hydroxybenzyl)benzenephosphinate], calculated analysis: P, 6.70%. Found: P, 6.49%.
(g) 1,6-hexanediol-bis[(3,5-di-t-butyl-4-hydroxybenzyl) benzenephosphinate], M.P. 168–173° C.
(h) 1,2-propylenediol-bis[(3,5-di-t-butyl-4-hydroxybenzyl)benzenephosphinate]
(i) 1,12-dodecandiol-bis[(3,5-di-t-butyl-4-hydroxybenzyl)benzenephosphinate].

EXAMPLE 3

2,2,4,4-tetramethyl-1,3-cyclobutanediol-bis[(3,5-di-tert-butyl-4-hydroxybenzyl)benzenephosphinate]

2.88 grams of 2,2,4,4-tetramethyl-1,3-cyclobutanediol (cis-trans mixture) (0.02 mole) was melted under nitrogen at 140° C. and 0.064 g. of lithium hydride was added. The melt was kept at this temperature until gas evolution ceases. Phenyl-[(3,5-di-tert-butyl-4-hydroxybenzyl) benzenephosphinate] (21.0 g., 0.048 mole) was added and the purified pink melt heated at 155 to 162° C. for about 1 hour. The by-product phenol (3.8 g.) was then removed by distillation at the same temperature at an initial vacuum of 20 mm. Hg and finally at about 1 mm. Hg vacuum. The reaction was cooled to room temperature, dissolved in about 100 ml. of hot benzene, acidified with glacial acetic acid, the benzene solution being washed successively with water, saturated sodium bicarbonate, and water. The benzene solution was dried over anhydrous sodium sulfate, the benzene being then removed by distillation at reduced pressure. The glassy residue was then crystallized by trituration with acetonitrile yielding white crystals, melting at 150 to 175° C. to a turbid melt.

Analysis for $C_{50}H_{70}O_6P_2$; mol. wt. 829.0: Calculated: P, 7.48%. Found P, 7.43%, 7.51%.

EXAMPLE 4

1,1,1-trimethylolpropane-tris-[(3,5-di-tert-butyl-4-hydroxybenzyl)benzenephosphinate]

2.14 grams of trimethylolpropane (0.016 mole) was melted at 60° C. under nitrogen and 0.22 g. of sodium methylate added with stirring. 21.8 grams of phenyl-(3,5-di-tert-butyl - 4 - hydroxybenzyl)benzenephosphinate was then added to this reaction mixture and the light pink melt heated at 150 to 160° C. for 5½ hours. The by-product phenol (3.9 g.) was distilled at 12 mm. Hg nitrogen pressure at the same temperature, and finally held at 0.30 mm. Hg pressure. The reaction mixture was cooled to room temperature and then dissolved in 100 ml. benzene. The benzene solution was washed successively with water, saturated sodium bicarbonate and water and finally dried over sodium sulfate. After removal of the benzene by distillation, the residue was crystallized twice from cyclohexane to give white crystals which melted at 115–120° C.

Analysis for $C_{69}H_{95}O_9P_3$; mol. wt. 1161.39: Calculated (percent): C, 71.36; H, 8.25; P, 8.03. Found (percent): C, 71.14; H, 8.32; P, 7.85.

In a similar fashion, the following triols were substituted in equivalent amounts for 1,1,1-trimethylolpropane (a) 1,1,1-trimethylolethane
(b) 1,1,1-trimethylolbutane There are thus respectively obtained
(a) 1,1,1-trimethylolethane-tris[(3,5-di-t-butyl-4-hydroxybenzyl)benzenephosphinate], M.P. 90–110° C.
(b) 1,1,1-trimethylolbutane-tris[(3,5-di-t-butyl-4-hydroxybenzyl)benzenephosphinate], M.P. 120–130° C.

EXAMPLE 5

Pentaerythritol-tetrakis-[3,5-di-tert-butyl-4-hydroxybenzyl)benzenephosphinate]

1.36 grams of pentaerythritol (0.01 mole) was dispersed in diethyleneglycol dimethyl ether (20 ml.) at 150° C. under nitrogen and 0.064 g. of lithium hydride added. The reaction mixture was stirred until foaming ceased whereupon 21.0 g. of phenyl[3,5-di-tert-butyl-4-hydroxybenzyl)benzenephosphinate] was added. The reaction mixture was heated at 155 to 160° C. at about 15 mm. Hg to gradually remove the diethyleneglycol dimethyl ether. The resulting clear, pink melt was heated at 150 to 161° C. under the same vacuum for 7 hours, during which the by-product phenol was distilled. The crude product was dissolved in 100 ml. of benzene, the benzene solution being made acid with glacial acetic acid and washed with 2 N sodium hydroxide, saturated sodium bicarbonate solution and warm water and dried over anhydrous sodium sulfate. The residue was recovered by distillation of the benzene at reduced pressure. The crude was purified by repeated trituration with hot heptane, and the crystallized form a solvent mixture of heptane-benzene, the crystalline product being washed with acetone, and finally recrystallized from heptane-benzene again, yielding white crystals melting at 135° C.

Analysis for $C_{80}H_{120}O_{12}P_4$; mol. wt. 1505.7: Calculated (percent): C, 70.98; H, 8.03; P, 8.23. Found (percent): C, 70.59; H, 8.05; P, 8.11.

EXAMPLE 6

4,4'-isopropylidenephenol-bis-[(3,5-di-t-butyl-4-hydroxybenzyl)benzenephosphinate]

11.4 grams of 4,4'-isopropylidenediphenol (0.05 mole) and 17.9 g. of dichlorophenylphosphine (0.100 mole) were dissolved in 75 ml. toluene and heated at reflux for 2¾ hours until no more hydrogen chloride was evolved, 95 equivalents being evolved. 25.4 grams of 3,5-di-t-butyl-4-hydroxybenzyl chloride (0.100 mole) dissolved in 130 ml. of nitromethane was added to the reaction mixture cooled to 0° C. 13.3 grams of aluminum chloride was added to the reaction mixture at −20° to −17° over a period of 20 minutes. The pale yellow homogeneous reaction mixture was then stirred at −10° for 3 hours. 100 ml. of ice-water was gradually added at −15° to −10°. The reaction mixture was then extracted with toluene (ca. 300 ml.) and washed succesively with water, 10% potassium carbonate solution and water and dried over anhydrous sodium sulfate. The residue isolated from the toluene solution, was dissolved in 30 ml. of benzene and extracted twice with 2 N aqueous sodium hydroxide until clear, the benzene solution being then washed with 6 N aqueous hydrochloric acid and dried over sodium sulfate. The yellow-brown glassy residue isolated from the benzene solution was triturated with boiling acetonitrile, yielding a thick crystalline slurry. The crystalline precipitate was filtered, and crystallized twice from acetone, yielding white crystals melting at 189–195° C.

Analysis for $C_{57}H_{70}O_6P_2$; mol. wt. 1505.70: Calculated (percent): C, 74.97; H, 7.74; P, 6.78. Found (percent): C, 74.68; H, 7.73; P, 6.75.

EXAMPLE 7

A batch of unstabilized polypropylene powder (Hercules Profax 6501) was thoroughly blended with 0.5% by weight of various compounds of this invention. Also prepared were samples of polypropylene containing 0.1% by weight of the compounds of this invention and 0.3% by weight of DSTDP. The blended materials were then milled on a two-rool mill at 182° C., for 10 minutes, after which time the stabilized polypropylene was sheeted from the mill and allowed to cool.

The milled polypropylene sheets were then cut into pieces and pressed for 7 minutes on a hydraulic press at 218° C., 2,000 pounds per square inch pressure. The resulting sheets of 25 mil thickness were tested for resistance to accelerated aging in a forced draft oven at 150° C. The results are set out in Table I below:

TABLE I

| Additives | Oven aging at 150° C. hours to failure |
|---|---|
| 0.5% of 2,2-dimethyl-1,3-propandiol-bis-[(3,5-di-t-butyl-4-hydroxybenzyl)-benzenephosphinate] | 730 |
| 0.5% of 2-methyl-2-ethyl-1,3-propandiol-bis-[(3,5-di-t-butyl-4-hydroxybenzyl)-benzenephosphinate] | 905 |
| 0.5% of 2,2-diethyl-1,3-propandiol-bis-[(3,5-di-t-butyl-4-hydroxybenzyl)benzenephosphinate] | 520 |
| 0.5% of 2-ethyl-2-butyl-1,3-propandiol-bis[(3,5-di-t-butyl-4-hydroxybenzyl)-benzenephosphinate] | 690 |
| 0.5% of 1,4-dimethylolbenzene-bis[(3,5-di-t-butyl-4-hydroxybenzyl)benzenephosphinate] | 165 |
| 0.5% of 2,2,4,4-tetramethyl-1,3-cyclobutanediol-bis-[(3,5-di-t-butyl-4-hydroxybenzyl)-benzenephosphinate] | 755 |
| 0.1% of 2,2,4,4-tetramethyl-1,3-cyclobutanediol-bis-[(3,5-di-t-butyl-4-hydroxybenzyl)-benzenephosphinate plus 0.3% DSTDP [1] | 1,455 |
| 0.1% of 1,1,1-trimethylolethane-tris-[(3,5-di-t-butyl-4-hydroxybenzyl)benzenephosphinate] plus 0.3% DSTDP [1] | 335 |
| 0.5% of 1,1,1-trimethylolpropane-tris-[(3,5-di-t-butyl-4-hydroxybenzyl)benzenephosphinate] | 480 |
| 0.1% of 1,1,1-trimethylolpropane-tris-[(3,5-di-t-butyl-4-hydroxybenzyl)benzenephosphinate] plus 0.3% DSTDP [1] | 495 |
| 0.1% of 1,1,1-trimethylolbutane-tris-[(3,5-di-t-butyl-4-hydroxybenzyl)benzenephosphinate] plus 0.3% DSTDP [1] | 695 |
| 0.1% of pentaerythritol-tetrakis-[(3,5-di-t-butyl-4-hydroxybenzyl)benzenephosphinate plus 0.3% DSTDP [1] | 670 |
| 0.1% of 4,4'-isopropylidenedicylohexano-[(3,5-di-t-butyl-4-hydroxybenzyl)benzenephosphinate] plus 0.3% DSTDP [1] | 280 |
| 0.1% of 2,2,4-trimethyl-1,3-pentanediol-bis-[(3,5-di-t-butyl-4-hydroxybenzyl)-benzenephosphinate] plus 0.3% DSTDP [1] | 210 |
| 0.1% isopropylidenediphenol-bis[(3,5-di-t-butyl-4-hydroxybenzyl)benzenephosphinate] plus 0.3% DSTDP | 430 |
| 0.5% of 1,6-hexanediol-bis[(3,5-di-t-butyl-4-hydroxybenzyl)benzenephosphinate] | 408 |
| Unstabilized polypropylene | 3 |
| 0.3% DSTDP alone | 20 |

[1] Distearylthiodipropionate (a synergist for phenolic antioxidants).

The above data clearly indicates the significant increase in the stabilization of polypropylene upon addition of the antioxidants of the present invention.

To 39.3 g. (0.15 mole) of hexamethylene diammonium adipate is added 0.177 g. ($7.5 \times 10^{-4}$ mole); 0.5 mole percent of hexamethylene diammonium diacetate as molecular weight control agent, and 0.183 g. (0.5% of theoretical nylon yield) of 2,2-dimethyl-1,3-propanediol-bis-[3,5-di-t-butyl-4-hydroxybenzyl)benzenephosphinate]. The mixture is blended thoroughly and added to a Pyrex polymer tube. The tube was evacuated and flashed four times with high purity dry nitrogen. The tube was heated for one hour in a 222° C. methyl salicylate vapor bath during which time water was eliminated. The tube was then placed in a second vapor bath at 275° C. (orthophenyl phenol) for one hour and then evacuated to 0.1 mm. for an additional ½ hour. The tube was removed from the heat and nitrogen introduced.

The nylon plug was ground to about 20 mesh granules. Initial viscosity of the nylon in reagent grade sulfuric acid (0.1% by weight) was determined at 30° C. The granules were aged for 65 hours at 140° C. in a forced draft oven, after which time the viscosity of the nylon was again determined and reported as to percent retention of original viscosity.

The stabilized nylon-6,6 showed a 90% retention of viscosity after testing while the blank containing no stabilizer showed only a 66% retention of viscosity, thus showing the superior performance of the stabilized samples.

In a similar fashion, nylon-6,6 samples were prepared and tested containing 0.5% of 2,2,4,4,-tetramethyl-1,3-cyclobutanediol - bis-[(3,5-di-t-butyl-4-hydroxybenzyl)benzenephosphinate] and 0.5% of 4,4'-isopropylidenedicyclohexanol - [(3,5-di-t-butyl-4-hydroxybenzyl)benzenephosphinate]. The samples showed a 91% and 88% retention in viscosity respectively.

EXAMPLE 9

A water-white, refined (U.S.P. grade) mineral oil (Esso Primol D) was stabilized under the following test conditions.

A sample of the mineral oil (10 g.) containing 0.1% by weight of 1,1,1-trimethylolbutane-tris-[(3,5-di-t-butyl-4-hydroxybenzyl)benzenephosphinate] was placed in a Sligh type oxidation flask filled with oxygen at room temperature (25° C.) and atmospheric pressure. Thereafter, the flask was sealed to form a system having a mercury manometer which measures the pressure changes as oxygen was absorbed by the sample in the flask. The sample was then heated at 150° C. until the manometer registered a decrease of 300 mm. Hg pressure within the flasks with reference to the maximum pressure obtained at 150° C. The results are set out in Table II below:

TABLE II

| Percent concentration of stabilizer: | Hours to failure at 150° C. |
|---|---|
| Unstabilized oil | 2.3 |
| 0.1 | 6.0 |

EXAMPLE 10

High impact polystyrene resin containing elastomer (i.e., butadiene-styrene) is stabilized against loss of elongation properties by incorporation of 0.5% by weight of 2 - ethyl - 2 - butyl - 1,3 - propandiol - bis - [(3,5 - di - t-butyl-4-hydroxybenzyl)benzenephosphinate]. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2,000 pounds per square inch into a sheet of uniform thickness (25 mil). The sheets are then cut into strips, approximately 4 x 0.5 inches. A portion of these strips is then measured for length of elongation in the Instron Tensile Tester (Instrom Engineering Corporation, Quincy, Mass.). The remaining portion of the strips is aged in a forced draft oven for 6 weeks at 75° C. and thereafter tested for elongation.

EXAMPLE 11

A quantity of SBR emulsion containing 100 g. of rubber (500 ml. of 20% SBR obtained from Texas U.S., Synpol 1500) previously stored under nitrogen, is placed in a beaker and stirred vigorously. The pH of the emulsion is adjusted to 10.5 with a 0.5 N NaOH solution.

To the emulsion is added 50 ml. of 25% NaCl solution. A 6% NaCl solution of pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm. Hg and finally to constant weight under high vacuum (<1 mm.) at 40–45° C.

The dried rubber (25 g.) is heated under nitrogen at 125° C. in a Brabender mixer and to this is added with mixing 1.25 g. (0.5%) of 2,2-dimethyl-1,3-propandiol-bis-[(3,5-di - t - butyl-4-hydroxybenzyl)benzenephosphinate]. The composition is mixed for 5 minutes after which it is cooled and compression molded at 125° C. into 5" x 5" x 0.025" plaques.

The plaques are placed on aluminum sheets and heated in a circulating air oven at 100° C. for up to 96 hours. The viscosity of a 0.5% toluene solution of aged and unaged rubber samples are determined at 25° C. Stabilizer effectiveness is judged by the percent retention of specific viscosity, color formation and gel content after oven aging. The stabilized rubber has better viscosity, color retention, and less gel content than the rubber which is unstabilized after oven aging.

Similar results are obtained when 2,2-diethyl-1,3-propanediol - bis - [(3,5-di-t-butyl-4-hydroxybenzyl)benzenephosphinate] is used in place of the above mentioned stabilizer in the rubber composition.

EXAMPLE 12

To 50 g. of polyacetal resin containing an acid scavenger dicyandiamide was added 0.25 of 2,2-dimethyl-1,3-propandiol - bis - [(3,5 - di-t-butyl-4-hydroxybenzyl)benzenephosphinate]. The resin containing this additive was milled for 7 minutes at 200° C. in a Brabender Plasti-recorder. The milled formulation was subsequently pressed into a 40 mil sheet at 215° C. at 350° p.s.i. for 90 seconds then cooled quickly in a cold press at 350° p.s.i. The stabilized sheets were then remolded for 2 minutes at compact pressure and for 3 minutes at 300° p.s.i. at 215° C. to give plaques 1½" x 2¼" x 125 mil. The resulting plaques were tested for resistance to accelerated aging in a force draft oven at 140° C. and the time in hours to 4% weight loss was measured. Unstabilized samples of polyacetal containing only dicyandiamide were tested in the same manner and the results compared in Table III below.

TABLE III

| Additives: | Time in hours to 4% wt. loss at 140° C. |
|---|---|
| 2,2 - dimethyl - 1,3 - propandiol-bis-[(3,5-di-t-butyl - 4 - hydroxybenzyl)benzenephosphinate | >300 |
| No additive | <130 |

The data clearly shows the significant increase in the stabilization of the polyacetal upon addition of the antioxidant of the present invention.

EXAMPLE 13

A composition is prepared comprising linear polyethylene and 1.0% by weight of 4,4'-isopropylidenedicylohexanol - bis - [(3,5-di-t-butyl-4-hydroxybenzyl)benzenephosphinate]. The composition is injected molded into tensile bars which are placed in a circulating air oven at 120° C. In contrast to those molded from unstabilized linear polyethylene, tensile bars molded from the instant composition retained its tensile strength for a substantially longer period.

EXAMPLE 14

Cyclohexene, freshly distilled is stabilized by the addition thereto of 0.01% by weight of 2,2-dimethyl-1,3-propandiol - bis - [(3,5 - di-t-butyl-4-hydroxybenzyl)benzenephosphinate]. The effectiveness of this stabilizer in cyclohexene is tested by the ASTM D525–55 oxidation test. The unstabilized cyclohexene fails in 29 minutes as compared to the stabilized cyclohexene which did not fail until 39 minutes.

EXAMPLE 15

A stabilized high temperature lubricating oil is prepared by incorporating 2% by weight of pentaerythritoltetrakis-[(3,5 - di-t-butyl-4-hydroxybenzyl)benzenephosphinate] to the lubricant, which comprises diisoamyladipate. The stabilized composition is compared with the unstabilized lubricant by heating at 175° in the presence of air and metallic catalysts according to the test method described in Military Specification Mil–I–7808c. After 72 hours, the blank containing no stabilizer contains more sludge and has a greater viscosity than the stabilized lubricant.

What is claimed is:

1. A compound of the formula

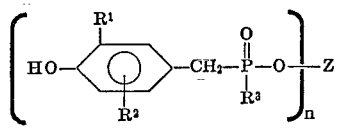

wherein $R^1$ is a lower alkyl group of from 1 to 4 carbon atoms;
$R^2$ is hydrogen or a lower alkyl group of from 1 to 4 carbon atoms;
$R^3$ is alkyl of from 1 to 4 carbon atoms or phenyl;
$n$ has a value of from 2 to 4; and
Z is a cycloalkylene of from 4 to 8 carbon atoms, a (lower) alkyl substituted cycloalkylene, alkylenephenylenealkylene of from 8 to 12 carbon atoms, cycloalkylenealkylenecycloalkylene of from 13 to 18 carbon atoms, phenylenealkylenephenylene of from 13 to 15 carbon atoms, or an aliphatic hydrocarbon of the formula $$C_yH_{2y+2-n}$$

in which $y$ has a value of from 2 to 12 when $n$ is 2 and a value of 3 to 7 when $n$ is greater than 2, the value of $y$ in all cases being equal to or greater than that of $n$.

2. A compound according to claim 1 wherein $n$ is 2 and Z is a divalent aliphatic hydrocarbon of the formula —$C_yH_{2y}$— in which $y$ has a value of from 3 to 9 and each of $R^1$ and $R^2$ is methyl or tertiary butyl.

3. A compound according to claim 2 which is a (3,5-di-t-butyl-4-hydroxybenzyl)phosphinic acid diester of a diol selected from the group consisting of 2,2-dimethyl-1,3-propandiol, 2-methyl-2-ethyl-1,3-propandiol, 2,2-diethyl-1,3-propandiol, 2-ethyl-2-butyl-1,3-propandiol, 2,2,4-trimethyl-1,3-pentanediol, and 1,6-hexanediol.

4. A compound according to claim 3 which is 2,2-dimethyl - 1,3 - propandiol-bis-[(3,5-di-t-butyl-4-hydroxybenzyl)benzenephosphinate].

5. A compound according to claim 3 which is 2,2-diethyl - 1,3 - propandiol - bis-[(3,5-di-t-butyl-4-hydroxybenzyl)benzenephosphinate].

6. A compound according to claim 3 which is 2-ethyl-2 - butyl - 1,3 - propandiol-bis-[(3,5-di-t-butyl-4-hydroxybenzyl)benzenephosphinate].

7. A compound according to claim 3 which is 1,6-hexanediol-bis - [(3,5 - di - t-butyl-4-hydroxybenzyl)benzenephosphinte].

8. A compound according to claim 1 wherein $n$ has a value of 3 to 4 and Z is an aliphatic hydrocarbon of the formula $$C_yH_{2y+2-n}$$

in which $y$ has a value of from 3 to 6, the value of $y$ being equal to or greater than the value of $n$; and each of $R^1$ and $R^2$ is methyl or tertiary butyl.

9. A compound according to claim 7 which is 1,1,1-trimethylolpropane - tris - [(3,5 - di - t-butyl-4-hydroxybenzyl-benzenephosphinate].

10. A compound according to claim 7 which is pentaerythritol - tetrakis - [(3,5 - di-t-butyl-4-hydroxybenzyl)-benzenephosphinate].

11. A compound according to claim 7 which is 1,1,1-trimethylolbutane - tris - [(3,5-di-t-butyl-4-hydroxybenzyl)benzenephosphinate].

12. A compound according to claim 1 wherein Z is cycloalkylene of from 4 to 8 carbon atoms or a (lower) alkyl substituted cycloalkylene and each of $R^1$ and $R^2$ is methyl or tertiary butyl.

13. A compound of claim 12 which is 2,2,4,4 - tetramethyl - 1,3 - cyclobutanediol - bis-[(3,5-di-t-butyl-4-hydroxybenzyl)-benzenephosphinate].

14. A compound according to claim 1 wherein Z is alkylenephenylenealkylene of from 8 to 12 carbon atoms and each of $R^1$ and $R^2$ is methyl or tertiary butyl.

15. A compound of claim 13 which is 1,4-benzenedimethanol-bis - [(3,5-di-t-butyl-4-hydroxybenzyl)benzenephosphinate].

16. A compound according to claim 1 wherein Z is cycloalkylenealkylenecycloalkylene of from 13 to 18 carbon atoms and each of $R^1$ and $R^2$ is methyl or tertiary butyl.

17. A compound according to claim 15 which is 4,4'-isopropylidenedicyclohexano - [(3,5-di-t-butyl-4-hydroxybenzyl)-benzenephosphinate].

18. A compound according to claim 1 wherein Z is phenylenealkylenephenylene of from 12 to 15 carbon atoms, and each of $R^1$ and $R^2$ is methyl or tertiary butyl.

19. A compound according to claim 18 which is 4,4'-isopropylidenediphenol - bis - [(3,5-di-t-butyl-4-hydroxybenzyl)-benzenephosphinate].

References Cited
FOREIGN PATENTS
230,143 10/1968 U.S.S.R. _____ 260—930

JOSEPH P. BRUST, Primary Examiner

U.S. Cl. X.R.
260—930; 252—400